United States Patent [19]
Ramesh

[11] Patent Number: 5,796,780
[45] Date of Patent: Aug. 18, 1998

[54] COHERENT MODULATION OF CPM SIGNALS

[75] Inventor: Rajaram Ramesh, Cary, N.C.

[73] Assignee: Ericsson Inc., Research Triangle Park, N.C.

[21] Appl. No.: 599,011

[22] Filed: Feb. 9, 1996

[51] Int. Cl.$^6$ .......................... H04L 27/10; H04L 27/12; H04L 27/14

[52] U.S. Cl. .......................... 375/274; 375/305; 375/336; 332/100; 329/300

[58] Field of Search .................... 375/271, 272, 375/273, 274, 279, 303, 305, 308, 329, 323, 334, 336; 332/100; 329/300

[56] References Cited

U.S. PATENT DOCUMENTS

| | | | |
|---|---|---|---|
| 4,945,549 | 7/1990 | Simon et al. | 375/280 |
| 5,151,925 | 9/1992 | Gelin et al. | 375/328 |

FOREIGN PATENT DOCUMENTS

| | | | |
|---|---|---|---|
| 2 118 406 | 10/1983 | United Kingdom | H04L 25/49 |

OTHER PUBLICATIONS

Bernard Sklar, "Digital communications Fundamental and Applications", Prentice Hall, New Jersey, pp. 403–407, 1988.

T. Aulin et al., Digital Phase Modulation, Application of Communications Theory, Plenum Press, New York, New York, 1986.

Sayar et al., "Nyquist 3 Pulse Shaping in Continuous Phase Modulation", *IEEE Transactions on Communications*, COM-35(1):57–67 (1987).

IEEE Transactions On Information Theory, Rimoldi: "A Decomposition Approach to CPM", vol. 34, No. 2, Mar. 1988, pp. 260–270.

IEEE Transactions On Communications, Aulin et al.: "Continuous Phase Modulation–Part II: Partial Response Signaling", vol. 29, No. 3, Mar. 1981, pp. 210–225.

Philips Telecommunications Review, Chung et al.: "Generalized Tamed Frequency Modulation", vol. 41, No. 1, Apr. 1983, pp. 82–91.

IEEE Transactions On Communication, Sayar et al.: "Nyquist 3 Pulse Shaping in Continuous Phase Modulation", vol. 35, Jan. 1987, pp. 57–67.

IEEE Transactions On Communications, Muilwijk: "Correlative Phase Shift Keying–A Class of Constant Envelope Modulation Techniques", vol. 29, No. 3, Mar. 1981, pp. 226–236.

*Primary Examiner*—Tesfaldet Bocure
*Attorney, Agent, or Firm*—Burns, Doane, Swecker & Mathis, L.L.P.

[57] ABSTRACT

Coherent modulation schemes for CPM signals. The disclosed schemes avoid the error probability increase due to the differential encoding by using a coherent encoder. A simple demodulator can be implemented by using a Nyquist-3 CPM scheme with coherent encoding. Such a scheme can be demodulated in substantially the same manner as signals modulated using M-PSK.

16 Claims, 7 Drawing Sheets

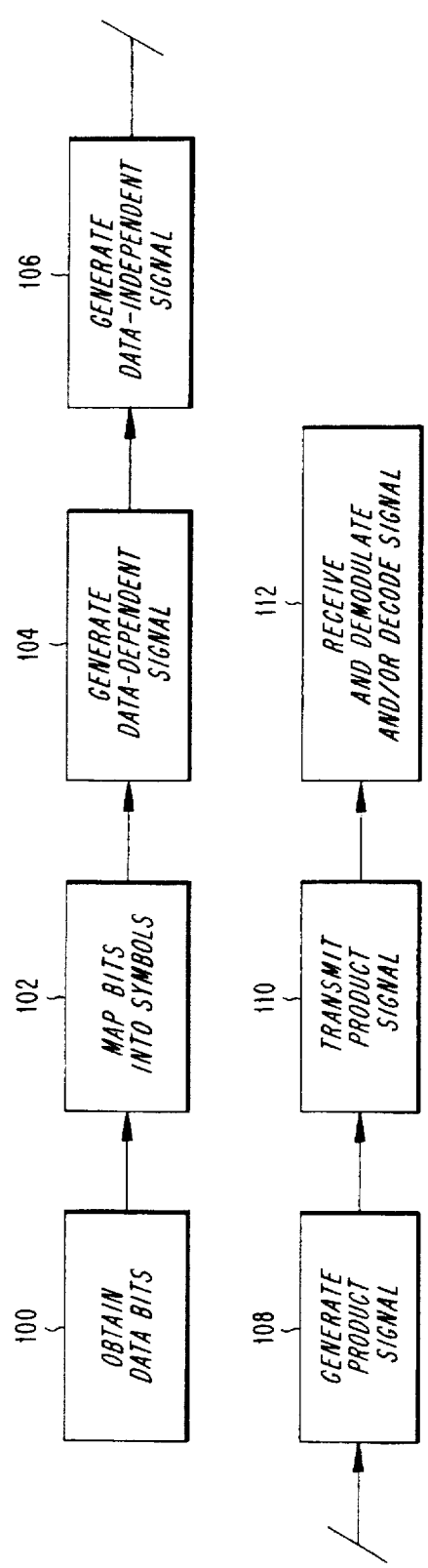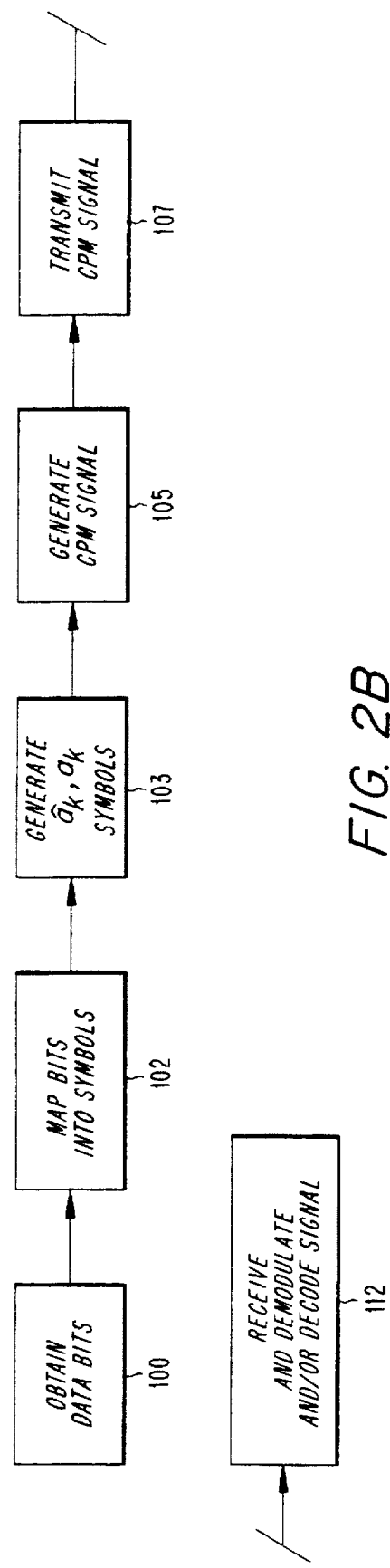
FIG. 2A
FIG. 2B

COHERENT MODULATION OF CPM SIGNALS

FIELD OF THE INVENTION

The present invention relates generally to the field of digital communications. More particularly, the present invention relates to a method and system for coherently modulating and demodulating a digital communication signal.

BACKGROUND OF THE INVENTION

Conventional continuous phase modulation (CPM) schemes inherently employ differential encoding to implement the continuous phase property of the modulation scheme. Such a scheme is described, for example, in T. Aulin, J. B. Anderson and C. E. W. Sundberg, Digital Phase Modulation, Applications of Communications Theory, Plenum Press, New York, N.Y., 1986. CPM signals are typically demodulated using a coherent demodulator and then differentially detected to obtain the data symbols. One drawback of the differential detection process is that an error in each demodulated symbol output by the demodulator results in errors in two output data symbols. This error rate is double the error rate achieved by coherent demodulation of a coherently modulated signal.

On a Gaussian channel, this doubling of the symbol error rate does not cause a significant loss in performance. However, over a fading channel, the bit error rate (BER) varies linearly with the signal to noise ratio (SNR); thus, the doubling of the symbol error rate implies a 3 dB performance loss. To avoid this loss, a coherently encoded CPM scheme is desirable.

For most applications requiring transmission of digital data over nonlinear and/or fading channels, constant-envelope digital modulation is desirable. Because of their simplicity, constant-envelope modulation schemes such as phase-shift keying (PSK) and frequency-shift keying (FSK) have often been used. The continuing need for better spectral utilization has led to the search for more bandwidth-efficient modulation schemes. It is known that the bandwidth of constant-envelope digital modulation schemes can be reduced by smoothing the variations of the information-carrying phase using an analog filter. Such a modulation scheme is called continuous phase modulation (CPM).

In addition to improved spectral efficiency, CPM schemes provide a coding gain over PSK schemes. The coding gain is due to the memory that is introduced by the phase-shaping analog filter, which can be used by a trellis decoder to decode the transmitted data symbols.

A coherently modulated CPM system is described, for example, in Rimoldi, "A Decomposition Approach to CPM", IEEE Transactions on Information Theory, 34(2): 260-270(1988). Rimoldi discloses a CPM system including a linear, time-invariant continuous phase encoder and a linear, time-invariant memoryless modulator. The time-invariant tilted phase trellis disclosed by Rimoldi results in a memoryless modulator of reduced complexity. The continuous phase encoder and the decoder are also simpler than for prior MSK systems, and the bit error probability for practical signal-to-noise ratios (SNRs) is reduced by a factor of two. However, the Rimoldi system teaches a complex implementation, and further does not teach how to convert a conventional CPM scheme into a constant envelope modulation scheme in which the data symbols are coherently encoded.

CPM schemes using Nyquist-3 pulse shaping have been suggested for use in mobile communications systems in, for example, Sayar and Pasupathy, "Nyquist 3 Pulse Shaping in Continuous Phase Modulation", IEEE Transactions on Communications, COM-35(1): 57-67(1987). Sayar et al. disclose how Nyquist-3 pulse shaping in CPM schemes provides generally improved spectral qualities. However, Sayar et al. do not disclose how Nyquist-3 pulse shaping can be practically implemented for coherently modulated data symbols. Further, Sayar et al. do not recognize the performance limitations inherent in practical applications of Nyquist-3 pulse shaping with conventional receiver filters.

It would be desirable to adapt a continuous phase modulation scheme to perform coherent modulation and coherent encoding of data symbols to maintain a low error rate over a fading channel.

It would further be desirable for such a CPM signal to be demodulated using a simple demodulator.

SUMMARY OF THE INVENTION

The present invention overcomes the above-noted problems, and provides other advantages, by providing a method for coherently modulating CPM signals. According to exemplary embodiments of the present invention, digital information in the form of data symbols is encoded; the encoded information is passed through a coherent CPM modulator. The receiver samples the transmitted information signal at symbol intervals or other predetermined intervals, and demodulates and decodes the sampled information.

BRIEF DESCRIPTION OF THE DRAWINGS

A more complete understanding of the features, operation, and advantages of the present invention can be obtained by reading the following Detailed Description of the Preferred Embodiments in conjunction with the accompanying drawings in which like reference indicia indicate like elements, and in which:

FIGS. 2A-B are flow charts showing alternative exemplary communication methods according to the present invention;

DETAILED DESCRIPTION OF THE PREFERRED EMBODIMENTS

Figure 1:
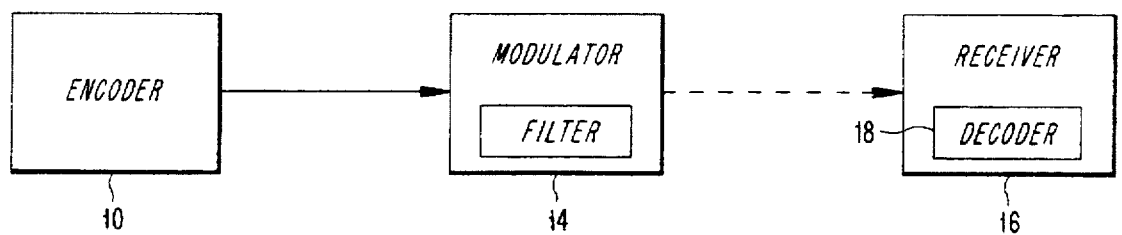
FIG. 1 is a block diagram of an exemplary communication system according to an embodiment of the present invention.

A CPM signal is characterized by a frequency pulse g(t), or by a corresponding phase pulse f(t). The relationship between the two is as follows:

$$f(t) = \int_{-\infty}^{t} g(u)du \quad (1)$$

Typically, g(t) is time-limited to some interval (0,LT). In addition, the normalization on f(t) is that $$f(\infty) = \frac{1}{2} \quad (2)$$

In terms of a sequence of data symbols $a_k$, and a modulation index h, a transmitted CPM signal is given by $$s(t) = e^{j2\pi h \int_{-\infty}^{t} \sum_{k=-\infty}^{\infty} a_k g(\tau - kT) d\tau} \quad (3)$$

In terms of f(t), equation (3) can be rewritten as $$s(t) = e^{j2\pi h \sum_{k=-\infty}^{\infty} a_k f(t-kT)} \quad (4)$$

The constant envelope property of a CPM scheme is evident from the above equation. It will be appreciated that equations (3) and (4) employ inherent differential decoding in CPM schemes.

The frequency pulse g(t) is non-zero only over the interval (0,LT), where T is the symbol period. This implies that $$f(t) = \begin{cases} 0, & t \leq 0 \\ 0.5 & t \geq LT. \end{cases} \quad (5)$$

Using the above information, equation (4) can be rewritten for the transmitted CPM signal as follows. For $mT \leq t \leq (m+1)T$, $$s(t) = e^{j2\pi h (\sum_{k=-\infty}^{m-L} a_k \frac{1}{2} + \sum_{k=1}^{L} a_{m-L+k} f(\tau + LT - kT))} \quad (6)$$

where $$\tau = t - mT. \quad (7)$$

For example, in a 4-level CPM scheme with modulation index 0.25, the symbol sequence $a_k \in \{-3,-1,1,3\}$, and the encoded symbol sequence $\hat{a}_k$ can be defined such that $\hat{a}_k \in \{0,1,2,3\}$. The relationship between symbols $a_k$ and encoded symbols $\hat{a}_k$ can be defined as:

$$a_k = 2\hat{a}_k - 3. \quad (8)$$

Thus, the CPM signal in this example is given by $$s(t) = e^{j\frac{\pi}{2} (\sum_{k=-\infty}^{m-L} (2\hat{a}_k - 3)\frac{1}{2} + \sum_{k=1}^{L} (2\hat{a}_{m-L+k} - 3)f(\tau + LT - kT))} \quad (9)$$

$$= e^{j\frac{\pi}{2} (\sum_{k=-\infty}^{m-L} \hat{a}_k + \sum_{k=1}^{L} 2\hat{a}_{m-L+k} f(\tau + LT - kT))} e^{j\frac{\pi}{2} (\sum_{k=-\infty}^{m-L} \frac{-3}{2} + \sum_{k=1}^{L} (-3)f(\tau + LT - kT))} \quad (10)$$

From equation (10), it is evident that the modulated signal can be separated into a data independent term $s_i(t)$ given by $$s_i(t) = e^{j\frac{\pi}{2} (\sum_{k=-\infty}^{m-L} \frac{-3}{2} + \sum_{k=1}^{L} (-3)f(\tau + LT - kT))} \quad (11)$$

and a data-dependent term $S_d(t)$ given by $$s_d(t) = e^{j\frac{\pi}{2} (\sum_{k=-\infty}^{m-L} \hat{a}_k + \sum_{k=1}^{L} 2\hat{a}_{m-L+k} f(\tau + LT - kT))} \quad (12)$$

It will be appreciated that the first summation in the expression for $s_d(t)$ in equation (12) is only unique modulo 4, by virtue of the complex exponentiation operation.

Now, consider a second symbol sequence $b_k$, which is defined by $$b_k = \left( \sum_{l=-\infty}^{k} \hat{a}_l \right) \bmod 4 \quad (13)$$

where mod N means the remainder divided by N. It will be appreciated that N may be represented $2^q$ in a general case.

In this example, since $$b_k \in \{0,1,2,3\} \quad (14)$$

and $$\hat{a}_k = (b_k - b_{k-1}) \bmod 4 \quad (15)$$

then, in terms of the second symbol sequence $b_k$, the expression for $S_d(t)$ can be rewritten as $$s_d(t) = e^{j\frac{\pi}{2} (b_{m-L} + \sum_{k=1}^{L} 2|(b_{m-L+k} - b_{m-L+k-1}) \bmod 4| f(\tau + LT - kT))} \quad (16)$$

The expression for $s_i(t)$ remains unchanged.

A conventional coherent demodulator detects the first symbol sequence $a_k$ by estimating the second symbol sequence $b_k$, and then performing the differential detection operation shown in equation (15) to determine the first sequence $a_k$. According to the present invention, the second symbol sequence $b_k$ includes all of the information carrying symbols, and differential detection is unnecessary. Such a $b_k$ signal is therefore a coherently modulated CPM signal.

Referring now to FIG. 1, a block diagram of an exemplary communication system according to an embodiment of the present invention is shown. The system includes a transmitter having an encoder 10 for encoding a digital information signal containing a number of data symbols, and a modulator 14 for modulating the data symbols and transmitting the filtered and encoded digital signal. Modulator 14 includes a filter for pulse-shaping. The system further includes a receiver 16 for receiving the transmitted signal. The receiver 16 includes a decoder 18 for decoding the transmitted signal. The decoder 18 can be implemented by a Viterbi decoder modeling a finite state machine formulated according to equation (16), or can include any other suitable decoder. The receiver 16 can also include a filter (not shown), such as a narrowband IF receive filter or multiple-tap compensation filter as will be described in more detail below, for filtering the received transmitted signal.

Referring now to FIGS. 2A–B, flow charts describing two alternative exemplary communications methods for transmitting data communication signals from a transmitter to a receiver according to the present invention are shown. Referring first to FIG. 2A, a transmitter obtains data bits from a source in step 100. In step 102, the transmitter maps sets of q data bits into data symbols $b_k$, where the symbols $b_k$ have one of the values $\{0,1,\ldots 2^q-1\}$ and k is a time index. It will be appreciated that the data bits may be passed through a channel encoder prior to the mapping performed in step 102.

In step 104, the transmitter generates a data-dependent signal of the form $$s_d(t) = e^{j2\pi h \left( b_{m-L} + \sum_{k=1}^{L} 2|(b_{m-L+k} - b_{m-L+k-1}) \bmod 2^q| f(\tau + LT - kT) \right)}$$

where h is the modulation index of the form $K/2^q$ for an integer K and $f(\tau)$ is a normalized phase pulse.

In step 106, the transmitter generates a data-independent signal of the form $$s_d(t) = e^{j2\pi h \left( \sum_{k=-\infty}^{m-L} \frac{-(2^q-1)}{2} + \sum_{k=1}^{L} (-(2^q-1))f(\tau+LT-kT) \right)}$$

In step 108, the transmitter generates a product signal which is the product of the data-dependent signal and the data-independent signal. In step 110, the product signal is transmitted over a communication channel from the transmitter to the receiver.

In step 112, the receiver receives the transmitted product signal and demodulates and/or decodes the received signal by estimating the data symbols $b_k$ from the received signal and determining the data bits from the estimation of the data symbols. The receiver preferably detects the phase angle of the received signals at predetermined sampling intervals. For the case where the source bits have been passed through a channel encoder prior to the mapping performed in step 102, the received signal is passed through a demodulator which outputs soft information representative of the encoded source bits generated by the channel encoder, and the soft information is passed through a channel decoder to estimate the source bits.

Referring now to FIG. 2B, an alternative communication method according to the present invention is shown. Steps 100 and 102 are the same as in the method shown in FIG. 2A. The method of FIG. 2B differs from that of FIG. 2A in step 103, in which the transmitter generates data symbols $a_k$ from symbols $b_k$ generated in step 102, where $$\hat{a}_k = (b_k - b_{k-1}) \bmod 2^q$$

and then generates $a_k$ where $$a_k = 2\hat{a}_k - (2^q - 1)$$

In step 105, the data symbols $a_k$ are passed through a CPM modulator at the transmitter to form a continuous phase modulated data signal. The CPM modulator includes a filter having a phase pulse $f(\tau)$.

In step 107, the transmitter transmits the continuous phase modulated signal over a communication channel, and the transmitted signal is received, sampled, and demodulated and/or decoded in step 112 as described above with respect to FIG. 2A.

It will be appreciated that other suitable methods incorporating the principles of the present invention will be readily apparent to those skilled in the art.

The decoder/demodulator 18 for the coherent CPM can be, for example, a Viterbi decoder modeling a finite state machine for the CPM signal. An exemplary state machine can be formulated using the description in equation (16). A state can be represented by the L-tuple set of values $\{b_{m-L}, \ldots b_{m-1}\}$. An input of $b_m$ to the finite state machine in the above state causes a transition to the state $\{b_{m-L}, \ldots b_{m-1}\}$, while emitting an output signal given by equations (16) and (11). The number of states is equal to $4^L$ in a 4-level CPM scheme.

A full response CPM scheme is one in which the frequency pulse $g(t)$ has support only in the range $(0, T)$. In such a scheme, the full response due to the modulating symbol can be achieved in one symbol interval. According to an exemplary embodiment of the present invention, Nyquist-3 CPM scheme can be implemented by using a Nyquist-3 filter as filter 12 to use a Nyquist-3 pulse as the frequency pulse. A Nyquist-3 pulse has support over multiple symbol intervals; however, if the CPM signal is observed at symbol intervals, the behavior is similar to a full response CPM signal.

A Nyquist-3 phase pulse is defined as $$f(kT) = 0, k \leq n$$
$$= 0.5, k \geq n+1. \tag{17}$$

Figure 3A:
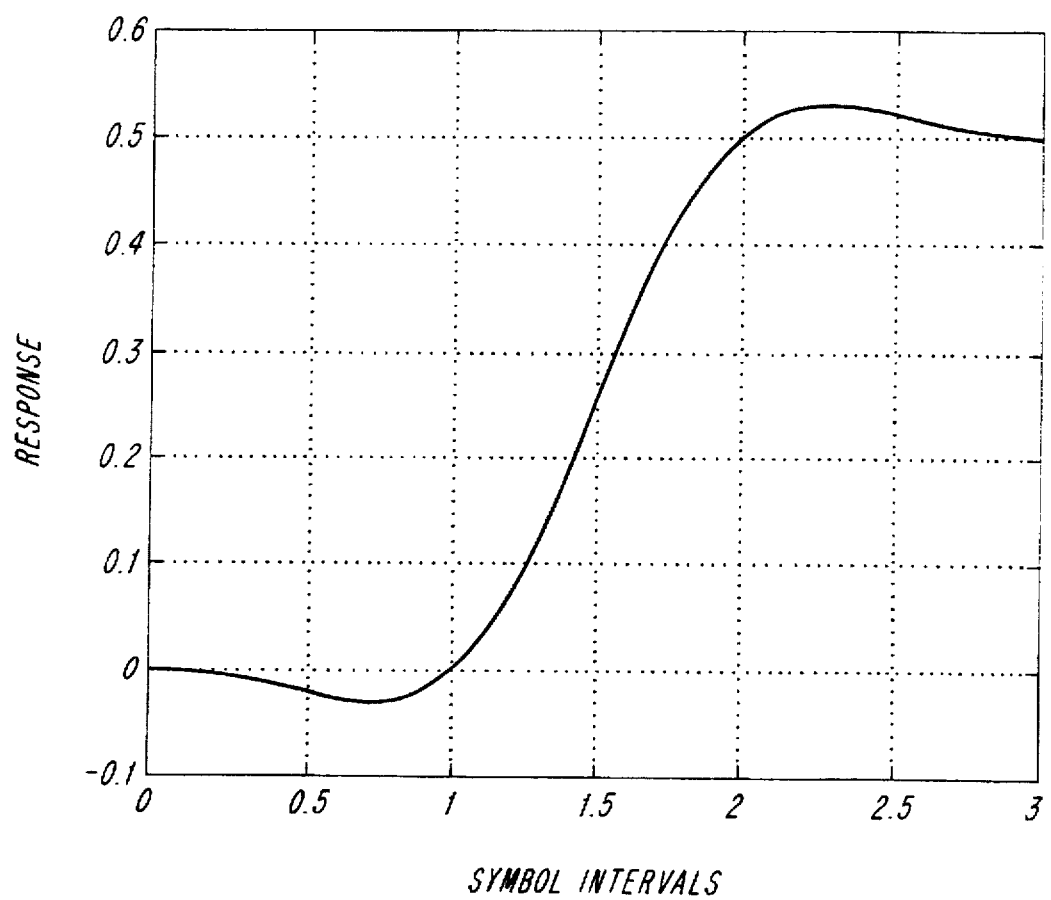
FIGS. 3A-B are a plot of an exemplary phase pulse for use in the system and method of the present invention and a graphical comparison of the spectra of full-response and Nyquist-3 CPM schemes, respectively.
Figure 3B:
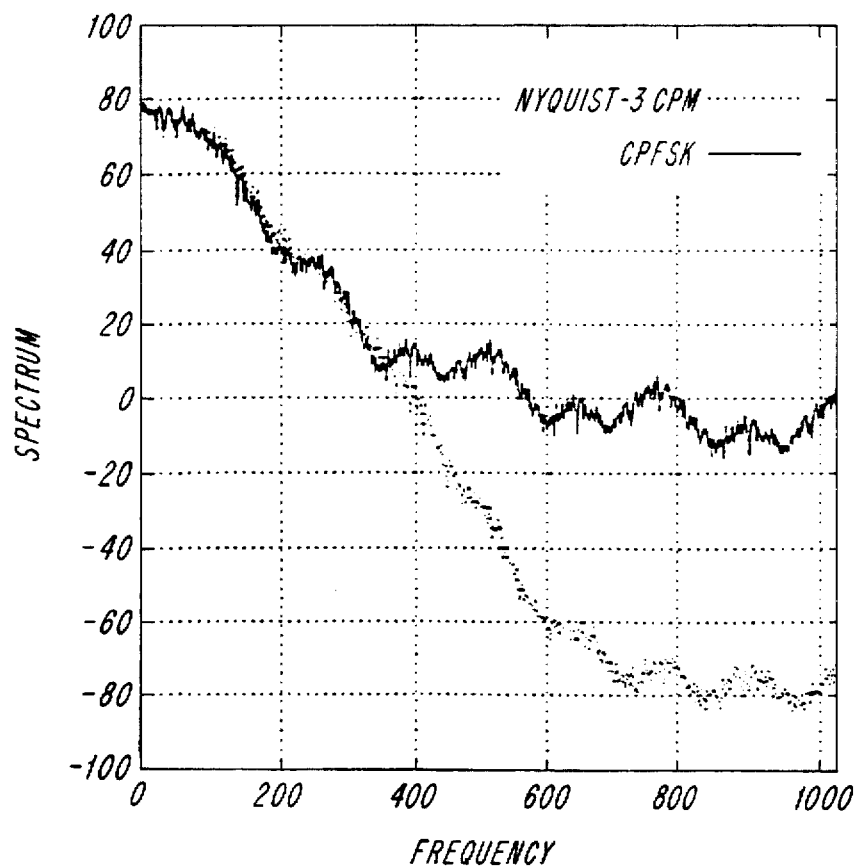

Such a pulse can be generated by passing a pulse with zero ISI (i.e., a Nyquist pulse) through a filter that has a frequency response substantially equal to the reciprocal of the sinc function. Referring now to FIG. 3A, a plot of a Nyquist-3 phase pulse is shown as an example. Although a full response pulse satisfies equation (19), a Nyquist-3 CPM scheme provides improved spectral qualities over a full response CPM scheme. In particular, the sidelobe levels in the spectrum can be reduced considerably by using Nyquist-3 CPM instead of full-response CPM. Referring now to FIG. 3B, a comparison of the spectra of 4-level CPFSK, which uses a full-response rectangular pulse as the frequency pulse, with the spectra of a Nyquist-3 CPM scheme using the phase pulse of FIG. 3A is shown.

Mathematically, this can be shown by considering the equation for the data dependent part of the coherently modulated CPM signal, i.e., $$s_d(t) = e^{j\frac{\pi}{2}(b_m - L + \sum_{k=1}^{L} 2|(b_{m-L+k} - b_{m-L+k-1} \bmod 4)|f(\tau+LT-kT))} \tag{18}$$

At integer multiples of the symbol period using, equation (19) in the above equation yields $$s_d((N+n)T) = e^{j\frac{\pi}{2}(b_{N-L} + \sum_{k=1}^{L} |(b_{N-L+k} - b_{N-L+k-1} \bmod 4)|)} \tag{19}$$

or equivalently $$S_d((N+n)T) = e^{j0.5\pi b_n}. \tag{20}$$

Thus, by removing the data-independent part from the received signal, the signal can be demodulated by simply observing it at the sampling points. This CPM demodulator 18 offers substantially reduced complexity.

Figure 4A:
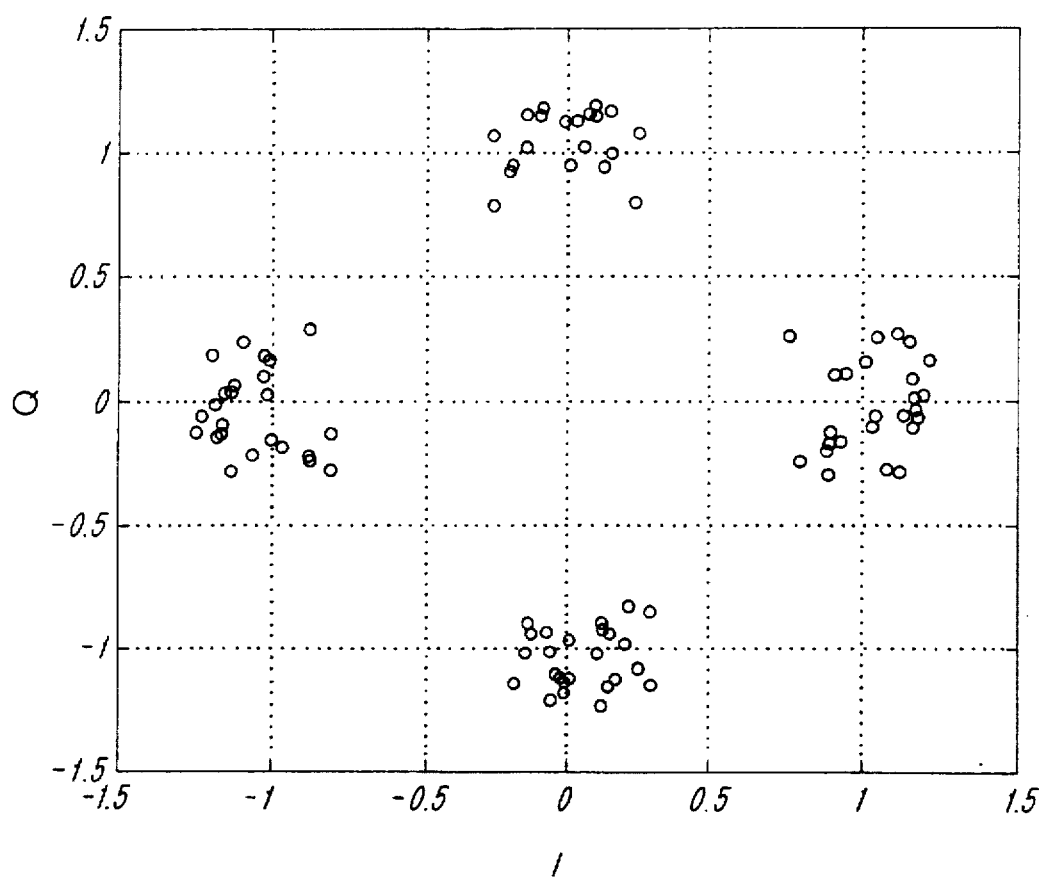
FIGS. 4A-B are a scatter plot and eye diagram, respectively, of received symbols using a narrowband IF filter.
Figure 4B:
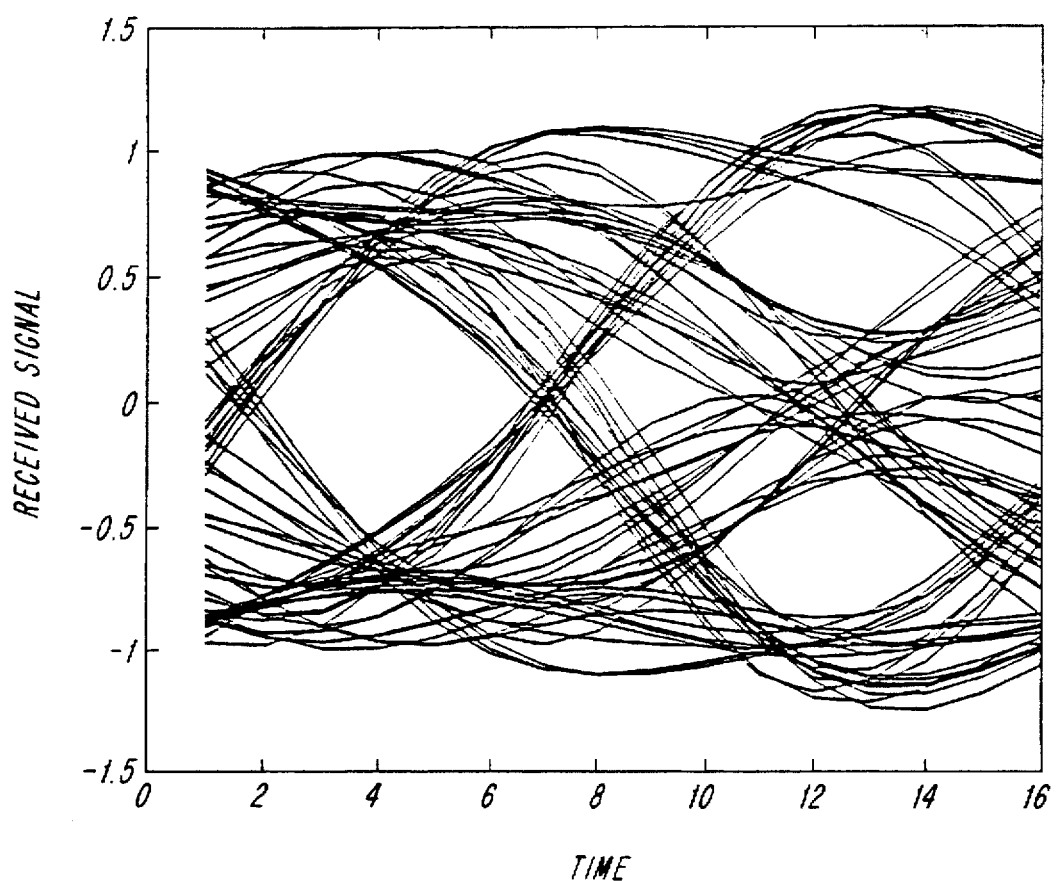

If a narrowband receive IF filter is used in receiver 16, signal distortion can occur. This distortion is small if the passband of the IF filter is wider than the band containing most of the CPM signal energy, but can lead to a degradation in performance, as illustrated by the scatter plot of the received symbols in FIG. 4A, and the eye diagram in FIG. 4B. The distortion causes a loss in power with respect to PSK systems; however, this loss is offset by the fact that the peak-to-average power of the CPM signal is lower.

Figure 5:
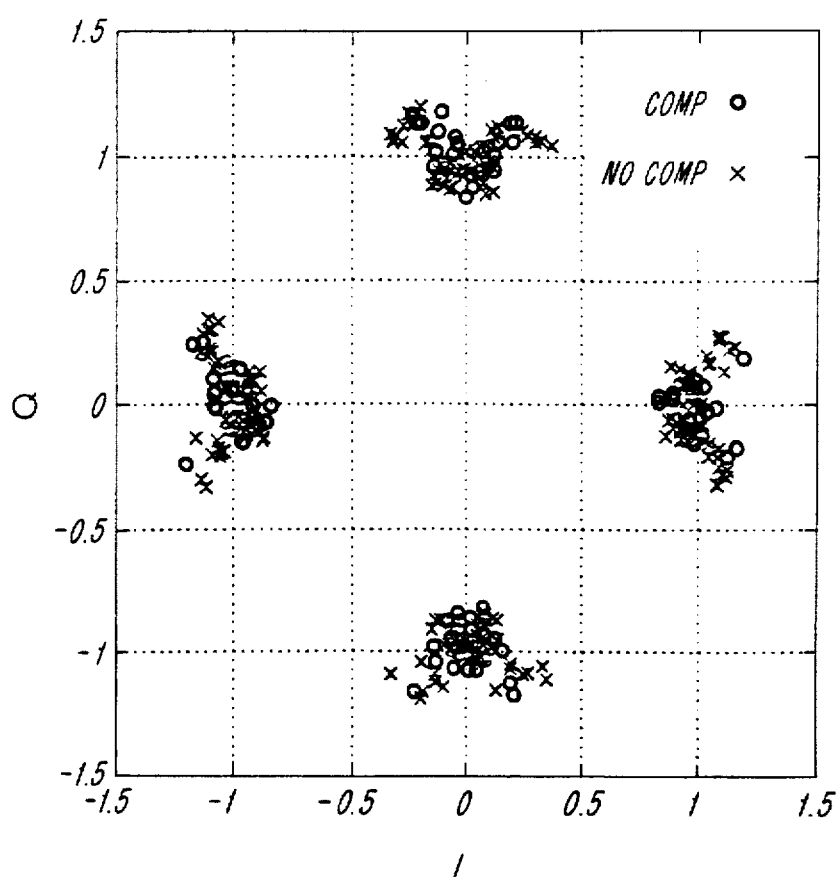
FIG. 5 is a scatter plot of received symbols using a compensation filter according to an embodiment of the present invention.

A compensation filter can be used for the receive filter in receiver 16 to improve performance. For example, a five tap compensation filter having taps at half-symbol intervals can be used. The compensation filter is preferably designed to minimize the squared error between the input and the known output and thereby substantially reduce the performance-degrading effects of conventional receiver filters, as described above. In practice, an algorithm such as the LMS algorithm or an equivalent algorithm can be used to determine the taps of the compensation filter. FIG. 5 shows scatter plots of the received symbols, with and without the compensation filter. It will be appreciated that the compensation filter improves performance by bringing the outlying points closer to the actual constellation point.

While the foregoing description includes many details and specificities, it will be appreciated that these are by way of example, only, and are not to be construed as limitations of the invention. Many modifications to the disclosed examples will be readily apparent to those of ordinary skill in the art which do not depart from the spirit and scope of the invention, as defined by the appended claims and their legal equivalents.

5,796,780

What is claimed is:

1. A method for transmitting and receiving a digital communications signal, comprising the steps of:

obtaining data bits from a source;

mapping sets of q data bits into data symbols $b_k$ having one of the $2^q$ values $\{0,1,\ldots,2^q-1\}$, where k is a time index;

generating a data dependent signal $$s_d(t) = e^{j2\pi h \left( b_{m-L} + \sum_{k=1}^{L} 2|(b_{m-L+k} - b_{m-L+k-1} \mod 2^q)| f(\tau + LT - kT) \right)}$$

where h is a modulation index of the form $K/2^q$ for an integer K and $f(\tau)$ is a normalized phase pulse;

generating a data independent signal $$s_i(t) = e^{j2\pi h \left( \sum_{k=-\infty}^{m-L} \frac{-(2^q-1)}{2} + \sum_{k=1}^{L} (-(2^q-1)) f(\tau + LT - kT) \right)}$$

generating a product signal from the data-dependent signal and the data-independent signal;

transmitting the product signal over a communication channel;

receiving the transmitted product signal; and demodulating the received signal by estimating the data symbols $b_k$ from the received signal determining the data bits from the estimation of the data symbols.

2. The method of claim 1, wherein the phase pulse has a Nyquist-3 pulse shape.

3. The method of claim 1, further comprising the step of filtering the received signal through a compensation filter prior to the step of demodulating.

4. The method of claim 1, wherein the step of demodulating includes sampling the phase angle of the received signal at predetermined sampling intervals.

5. The method of claim 3, wherein the compensation filter is a five-tap compensation filter having taps at half-symbol intervals.

6. The method of claim 5, wherein the compensation filter minimizes a mean-squared error value between the received signal and a predetermined signal known to the receiver.

7. The method of claim 6, wherein the compensation filter is a multiple-tap compensation filter having taps determined by an LMS algorithm at predetermined intervals.

8. The method of claim 1, further comprising the step of encoding the data bits from the source prior to the step of mapping, and wherein the step of demodulating is performed by passing the received signal through a demodulator to generate soft information representative of the encoded data bits and passing the soft information through a channel decoder to estimate the data bits from the source.

9. A method for transmitting and receiving a digital communications signal, comprising the steps of:

obtaining data bits from a source;

mapping sets of q data bits into second data symbols $b_k$ having one of the $2_q$ values $\{0,1,\ldots,2^q-1\}$, where k is a time index;

generating first data symbols $\hat{a}_k$, where $$\hat{a}_k = (b_k - b_{k-1}) \mod 2^q$$

generating new data symbols $a_k$, where $$a_k = 2\hat{a}_k - (2^q - 1)$$

passing the new data symbols $a_k$ through a CPM modulator having a modulation index h and phase pulse $f(\tau)$, to form a continuous phase modulation signal;

transmitting the continuous phase modulated signal over a communication channel;

receiving the transmitted signal; and demodulating the received signal by estimating the data symbols $b_k$ from the received signal.

10. The method of claim 9, wherein the phase pulse has a Nyquist-3 pulse shape.

11. The method of claim 9, further comprising the step of filtering the received signal through a compensation filter prior to the step of demodulating.

12. The method of claim 9, wherein the step of demodulating includes sampling the phase angle of the received signal at predetermined sampling intervals.

13. The method of claim 11, wherein the compensation filter is a five-tap compensation filter having taps at half-symbol intervals.

14. The method of claim 13, wherein the compensation filter minimizes a mean-squared error value between the received signal and a predetermined signal known to the receiver.

15. The method of claim 14, wherein the compensation filter is a multiple-tap compensation filter having taps determined by an LMS algorithm at predetermined intervals.

16. The method of claim 9, further comprising the step of encoding the data bits from the source prior to the step of mapping, and wherein the step of demodulating is performed by passing the received signal through a demodulator to generate soft information representative of the encoded data bits and passing the soft information through a channel decoder to estimate the data bits from the source.

* * * * *